United States Patent [19]

Peschmann

[11] 4,071,763

[45] Jan. 31, 1978

[54] ELECTRORADIOGRAPHIC DEVICE

[75] Inventor: Kristian Peschmann, Aachen, Germany

[73] Assignee: U.S. Philips Corporation, New York, N.Y.

[21] Appl. No.: 699,343

[22] Filed: June 24, 1976

[30] Foreign Application Priority Data

June 28, 1975 Germany ............................ 2529037

[51] Int. Cl.$^2$ ............................................ G01T 1/18

[52] U.S. Cl. ................................ 250/374; 250/385; 313/93

[58] Field of Search .................. 250/374, 385; 313/93

[56] References Cited

U.S. PATENT DOCUMENTS

| | | | |
|---|---|---|---|
| 3,126,479 | 3/1964 | Mattson | 250/374 |
| 3,560,746 | 2/1971 | Lansiart | 313/93 |
| 3,911,279 | 10/1975 | Gilland et al. | 250/385 |
| 3,930,162 | 12/1975 | Reiss | 250/385 |
| 3,969,624 | 7/1976 | Van Biesen et al. | 250/315 R |
| 3,975,638 | 8/1976 | Grunberg et al. | 250/385 |
| 3,988,583 | 10/1976 | Fukase et al. | 250/315 R |

OTHER PUBLICATIONS

"Electron & Nuclear Counters" by Serge Korff (4th Printing), Van Nostrand Co., (1948), pp. 89–111.

*Primary Examiner*—Harold A. Dixon
*Attorney, Agent, or Firm*—Frank R. Trifari

[57] ABSTRACT

Xonics chambers can normally be used only with comparatively low electrode voltages in the Townsend-plateau region of the discharge where no charge carrier multiplication occurs. The sensitivity is then comparatively low. The sensitivity can be increased by increasing the electrode voltage, but this gives rise to a high electrode voltage for a reasonable charge carrier multiplication. According to the invention a gas is added whose ionization energy is smaller than the energy of the lowest metastable levels of the rare gas in the chamber. The charge carrier multiplication, and hence the sensitivity is thus improved without the electrode voltage being substantially increased. For example, when 0.2% by volume trimethylamine is added, an electrode voltage of 13 kV already suffices.

6 Claims, 2 Drawing Figures

ELECTRORADIOGRAPHIC DEVICE

BACKGROUND OF INVENTION

The invention relates to an electroradiographic device comprising two electrodes which are connected to a voltage source and between which a heavy-atom rare gas is present at excess pressure, the said rare gas absorbing a substantial part of the X-radiation, a small part of a different gas being added to the said rare gas.

A device of this kind is known for example from German Offenlegungsschrift 2,258,364. This devices serves for recording X-ray images, i.e. for the recording of the intensity distribution of an X-ray beam which is incident perpendicularly to the parallel extending electrodes. An X-ray image is then formed as follows:

When X-radiation passes through the heavy atom rare gas — preferably xenon or krypton — present between two electrodes, the gas is ionized and the ions and electrons thus produced are accelerated in the direction of the two electrodes. One of the two electrodes is preceded by an insulating foil, for example, made of mylar, on which the charge carriers accelerated towards this electrode are incident and on which an electrical charge image is produced. This charge image is negative if the insulating foil is arranged in front of the positive electrode, while it is positive if the insulating foil is arranged in front of the negative electrode. The radiation distribution thus converted into an electrical charge image can be made visible by way of a developing method as commonly used for electrostatic copying.

For medical X-ray diagnoses it is of essential importance that the radiation dose applied to a patient during X-ray exposure is as small as possible. The sensitivity of such a device, therefore, should be as high as possible, i.e. the number of charge carriers imparted to the insulating foil per X-ray quantum should be as high as possible. One possibility of increasing the sensitivity consists in the increasing of the number of charge carriers formed per X-ray quantum absorbed by increasing the voltage between the electrodes, so that a noticeable electron multiplication occurs due to impact ionization. The number of charge carriers generated by an X-ray quantum is thus increased.

In practice, however, several drawbacks occur. In the case of a pure xenon filling at a pressure of 7 bar and a distance of 10 mm between the electrodes, a voltage of approximately 60 kV must prevail between the electrodes in order to enable the device to operate in the range of charge carrier multiplication. Moreover, uncontrolled, comparatively strong electrical discharges which disturb the charge image can occur.

Presumably in order to eliminate these drawbacks, it is stated in German Offenlegungsschrift 2,253,364 (page 10, first paragraph) that operation in the avalanche region should take place only if the product of the distance between the electrodes and the pressure is smaller than 10 mm.bar. This is because, on the one hand, the voltage to be applied can be reduced, while on the other hand no uncontrolled discharges occur. However, the quantum absorption is thus substantially reduced, which means that an inadequate fraction of the incoming X-ray quanta contributes to the image formation. This causes the so-termed "quanta" or "distribution" noise whereby the image quality is reduced. Therefore, the said publication states that operation should be in a region substantially beyond 10 mm.bar, notably in a region between 20 mm.bar and 80 mm.bar. The voltage between the electrodes must then be adjusted so that a discharge occurs in the region of the so-termed Townsend plateau, the secondary charge carriers, formed by the deceleration of the energy-rich X-ray photoelectrons, not being further multiplied.

Moreover, German Auslegeschrift 1,909,428 discloses a spark chamber containing a xenon filling which is used for the localizing detection of nuclear radiation particles, gamma or X-ray quanta, the voltage between the electrodes being chosen so that uniformly distributed spark discharges occur with a charge carrier multiplication of at least 10,000. In order to decrease the voltages to be applied to the electrodes, it is stated that between 1.05% and 6.57% diethylamine must be added to the xenon filling. Diethylamine has an ionization energy which is lower than the energy of the lowest metastable levels of the xenon atoms.

However, this spark chamber is used at an overall gas pressure of 760 Toss $\approx$ 1 bar and a distance between the electrodes of 3.3 mm, so that a pressure/electrode distance product of $\approx$ 3.3 mm.bar occurs. As is known already, for such a value of the pressure/electrode distance product, the absorption of the X-ray quanta by the xenon filling is so small that the higher sensitivity, in principle possible as a result of the charge carrier multiplication, cannot at all be utilized on account of the increased quanta noise.

SUMMARY OF INVENTION

The invention has for its object to provide an electroradiographic device in which the sensitivity is improved without very high electrode voltages being required, without uncontrolled discharges occurring and without reduction of the quanta absorption. To this end, the product of pressure and electrode distance should, therefore, be considerably larger than 10 mm.bar, preferably larger than 30 mm.bar.

To this end, a radiographic device of the kind set forth according to the invention is characterized in that the added gas has an ionization energy which at the utmost equals the ionization energy of the lowest metastable levels of the atoms of the rare gas.

In a preferred embodiment the electrodes of the device are flat rectangular plates but at least one of the electrodes can be subdivided in order to provide a local sensitive detector, preferably the electrodes then have a small and elongated shape.

DESCRIPTION OF THE DRAWINGS

The invention will be described in detail hereinafter with reference to the drawing.

DETAILED DESCRIPTION OF INVENTION

Figure 1:
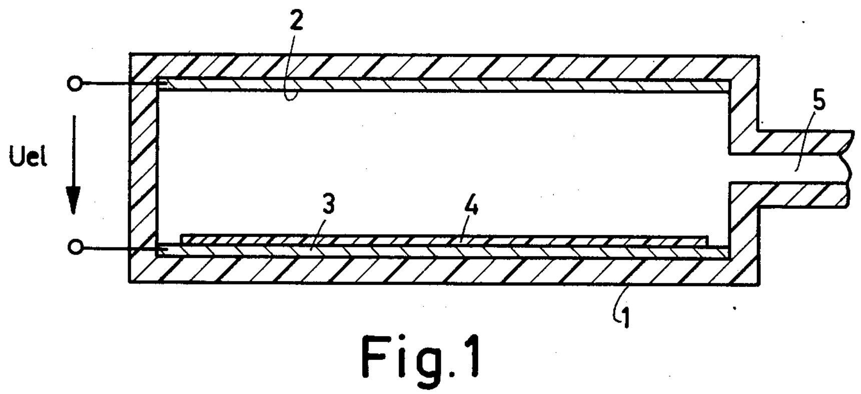
FIG. 1 is a diagrammatic front view of an electroradiographic device.

FIG. 1 diagrammatically shows a commonly used electroradiographic device of the kind set forth. This device consists of a gastight flat housing 1, the inner faces of which are provided with electrodes 2 and 3 wherebetween a voltage $U_{el}$ is present. One of the electrodes, in this case the electrode 3, is provided with an insulating foil 4 on which charge carriers produced by incident X-radiation are incident. The device is connected to a valve unit not shown via the outlet 5, the distance between the electrodes being 1 cm, and contains a rare gas, preferably xenon, at a pressure of 7 bar. If a ten-fold current amplification (i.e. for each absorbed X-ray quantum 10 charge carrier pairs are generated) were to be obtained by means of this device, a voltage of 60 kV would have to be applied between the electrodes. The generation of such a high voltage would require an expensive high-voltage generator and a high-voltage resistant construction of the chamber, and uncontrolled discharges which disturb the image at the area of the discharge would be liable to occur.

In accordance with the invention, this voltage can be substantially reduced by the addition of a small quantity of a gas having an ionization energy which is smaller than the lowest metastable levels of the rare gas atoms. Trimethylamine is a very suitable gas for this purpose.

Figure 2:
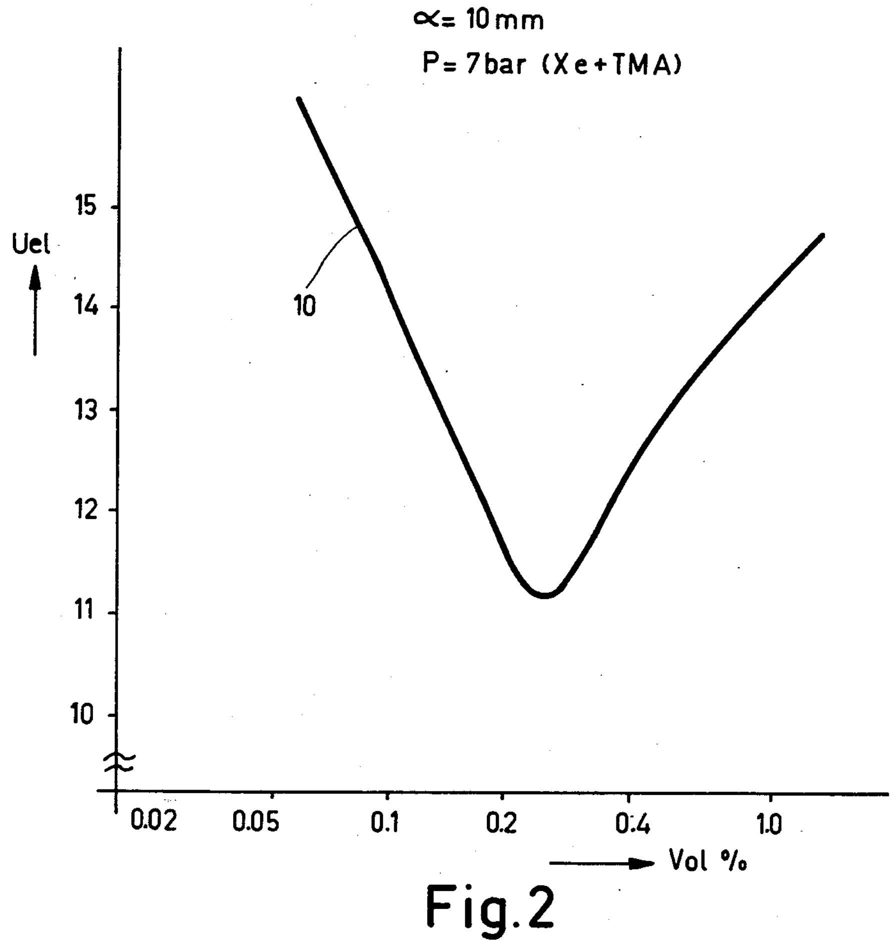
FIG. 2 illustrates the dependence of the voltage on the electrodes, required for obtaining a given currrent amplification, from the concentration of the added gas at a given pressure.

The curve 10 of FIG. 2 illustrates the dependence of the electrode voltage $U_{el}$, required for a current amplification of 10, on the concentration of the added gas at a gas pressure of 7 bar and a distance between the electrodes of 10 mm (current amplifications substantially larger than 20 cannot be used, because the X-ray dose required for an image is then so small that the quanta noise becomes noticeable and also because at higher current amplifications uncontrolled discharges are liable to occur). The electrode voltage is lowest at a concentration of from approximately 0.25 to 0.30% by volume. Larger or smaller concentrations require a higher electrode voltage for obtaining the same current amplification. The optimum concentration at which the electrode voltage to be applied is minimum increases as the gas pressure increases. The graph shows that when 0.27% trimethylamine is added, an electrode voltage of only 11.25 kV is required for obtaining a current amplification of 10.

When the electroradiographic device was provided with a filling of pure xenon at a pressure of 8 bar, while the distance between the electrodes amounted to 10 mm and the electrode voltage was 13 kV, a dose of 8 mR was required for making an x-ray image of a test object. When 0.27% trimethylamine was added, the other parameters remaining the same, the required dose decreased to 0.45 mR.

Further gases which result in a reduction of the required electrode voltage in the case of a xenon filling are:

dimethylamine
diethylamine
dipropylamine
dimethylhydrazine
cyclooctatetraene
1,3,5,7 octatetraene
1,2 dimethylcyclopentadiene
5,5 dimethylcyclopentadiene
2,3 dimethylfurane
tetramethylethylene.

When the electroradiographic device contains a krypton filling, besides the said gases which are suitable for xenon, gases having a slightly higher ionization energy can also be used, because the lowest metastable level for krypton (approximately 10 eV) is higher than that for xenon (approximately 8.3 eV). It is important that the added gas has an ionization energy which is lower than the lowest metastable levels of the rare gas used, and that the gas has a sufficiently high vapor pressure at the prevailing temperature to enable adjustment of the optimum concentration values for the mixture with the principle gas.

I claim:

1. An electroradiographic device comprising:

two facing planar electrodes for connection to a voltage source;

a rare gas at superatmospheric pressure between said facing electrodes for absorbing x-radiation;

an insulating foil on one of said electrodes on the side facing the other of said electrodes for producing a charge image thereon; and less than 2% by volume of a different gas mixed with said rare gas, said different gas having an ionization energy which does not exceed the ionization energy of the lowest metastable levels of the atoms of the rare gas.

2. An electroradiographic device as defined in claim 1 wherein the rare gas is selected from the group consisting of krypton and xenon and the different gas is trimethylamine.

3. An electroradiographic device as defined in claim 1 wherein the rare gas is selected from the group consisting of krypton and xenon and the different gas is selected from the group consisting of dimethylamine, dipropylamine, dimethylhydrazine, cyclooctatetraene, 1,3,5,7 octatetraene, 1,2 dimethylcyclopentadiene, 5,5 dimethylcyclopentadiene, 2,3, dimethylfurane and tetramethylethylene.

4. An electroradiographic device as defined in claim 1 wherein the different gas is less than 1% by volume.

5. An electroradiographic device as defined in claim 4 wherein the rare gas is selected from the group consisting of krypton and xenon and the different gas is diethylamine.

6. An electroradiographic device as defined in claim 4 wherein the rare gas is xenon at a pressure of approximately 7 bar and the different gas is trimethylamine at a concentration by volume of between 0.1% and 0.5%.

* * * * *